United States Patent
Xiao

(10) Patent No.: US 11,228,590 B2
(45) Date of Patent: Jan. 18, 2022

(54) DATA PROCESSING METHOD AND APPARATUS BASED ON MOBILE APPLICATION ENTRANCE AND SYSTEM

(71) Applicant: Tencent Technology (Shenzhen) Company Limited, Shenzhen (CN)

(72) Inventor: Heng Xiao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 315 days.

(21) Appl. No.: 15/608,801

(22) Filed: May 30, 2017

(65) Prior Publication Data

US 2017/0264610 A1 Sep. 14, 2017

Related U.S. Application Data

(63) Continuation of application No. PCT/CN2016/081169, filed on May 5, 2016.

(30) Foreign Application Priority Data

Jun. 9, 2015 (CN) .......................... 201510312567.7

(51) Int. Cl.
*G06F 21/00* (2013.01)
*H04L 29/06* (2006.01)
(Continued)

(52) U.S. Cl.
CPC .......... *H04L 63/0876* (2013.01); *G06F 9/541* (2013.01); *G06F 21/44* (2013.01); *H04L 29/06* (2013.01); *H04L 2463/082* (2013.01)

(58) Field of Classification Search
CPC .......... H04L 63/0876; H04L 2463/082; H04L 29/06; G06F 9/541
See application file for complete search history.

(56) References Cited

U.S. PATENT DOCUMENTS 9,602,482 B1 * 3/2017 Roth .................. H04L 63/08
2010/0251340 A1 * 9/2010 Martin ................ G06F 21/51
726/4

(Continued)

FOREIGN PATENT DOCUMENTS

CN 102143146 A 8/2011
CN 103078827 A 5/2013
(Continued)

OTHER PUBLICATIONS

Tencent Technology, ISRWO, PCT/CN2016/081169, Jun. 29, 2016, 9 pgs.

(Continued)

*Primary Examiner* — Trong H Nguyen
*Assistant Examiner* — Michael M Lee
(74) *Attorney, Agent, or Firm* — Morgan, Lewis & Bockius LLP

(57) ABSTRACT

A data processing method is performed at a computer system managing application programming interfaces (APIs) and mobile application entrances. An API invocation request initiated by an application system is received by the computer system, permission information corresponding to the application system is obtained according to an identifier of the mobile application entrance and an application system identifier that are carried in the API invocation request, then authentication is performed on the API invocation request according to the permission information and first authentication information carried in the API invocation request, and the application system is allowed to invoke an API for data processing when the authentication succeeds, so that internal data corruption caused due to that each application system at a mobile application entrance randomly invoke the API is avoided, thereby implementing uniform management on the (Continued)

internal data, greatly strengthening data security, and facilitating API interface expansion.

11 Claims, 4 Drawing Sheets

(51) Int. Cl.
*G06F 21/44* (2013.01)
*G06F 9/54* (2006.01)

(56) References Cited

U.S. PATENT DOCUMENTS

| | | | | |
|---|---|---|---|---|
| 2011/0085667 | A1* | 4/2011 | Berrios | G06F 21/445 380/282 |
| 2011/0196914 | A1* | 8/2011 | Tribbett | G06F 9/541 709/203 |
| 2012/0144457 | A1* | 6/2012 | Counterman | H04L 9/3247 726/5 |
| 2013/0139235 | A1* | 5/2013 | Counterman | H04L 63/061 726/7 |
| 2014/0006772 | A1* | 1/2014 | Qureshi | G06F 21/14 713/150 |
| 2014/0032691 | A1* | 1/2014 | Barton | H04L 41/00 709/206 |
| 2014/0189808 | A1* | 7/2014 | Mahaffey | H04L 63/083 726/4 |
| 2014/0331240 | A1* | 11/2014 | Zhao | G06F 9/541 719/328 |
| 2015/0248543 | A1* | 9/2015 | Yoshinari | G06F 21/10 726/28 |
| 2016/0127255 | A1* | 5/2016 | Cobb | G06F 9/46 709/226 |
| 2016/0142399 | A1* | 5/2016 | Pace | H04L 63/0815 726/4 |
| 2016/0234245 | A1* | 8/2016 | Chapman | H04L 63/1433 |

FOREIGN PATENT DOCUMENTS

| | | |
|---|---|---|
| CN | 103973642 A | 8/2014 |
| CN | 105187372 A | 12/2015 |
| WO | WO 2015025404 A1 | 2/2015 |

OTHER PUBLICATIONS

Tencent Technology, IPRP, PCT/CN2016/081169, Dec. 12, 2017, 5 pgs.

* cited by examiner

DATA PROCESSING METHOD AND APPARATUS BASED ON MOBILE APPLICATION ENTRANCE AND SYSTEM

PRIORITY CLAIM AND RELATED APPLICATION

This application is a continuation application of PCT Patent Application No. PCT/CN2016/081169, entitled "DATA PROCESSING METHOD AND APPARATUS BASED ON MOBILE APPLICATION ENTRANCE, AND SYSTEM" filed on May 5, 2016, which claims priority to Chinese Patent Application No. 201510312567.7, entitled "DATA PROCESSING METHOD AND APPARATUS BASED ON MOBILE APPLICATION ENTRANCE, AND SYSTEM" filed on Jun. 9, 2015, both of which are incorporated by reference in their entirety.

FIELD OF THE TECHNOLOGY

The present disclosure relates to the field of communications technologies, and in particular, to a data processing method and apparatus managing mobile application entrances.

BACKGROUND OF THE DISCLOSURE

With the development of communications technologies, various instant messaging tools rapidly spring up, and WeChat is one of them. In some instant messaging tools, to meet different requirements of enterprise users, various application management channels and address-book operation channels that can be self-developed are generally provided. Using WeChat as an example, an enterprise number is a mobile application entrance provided by WeChat for providing mobile services for the enterprise users. By using the mobile application entrance, the enterprise users can develop and manage multiple applications by themselves, for example, configuring multiple service numbers to connect different enterprise application systems, and enrich communication and exchange among enterprise internal employees by using the applications.

In the existing technologies, because demand sides of each application within the enterprise number belong to different organizations, different development and maintenance are performed. In addition, because each application may randomly invoke an application interface for data processing such as delivering a message to an enterprise internal employee, internal data corruption of the enterprise number is easily caused, and use of the enterprise number is affected, for example, application error, resulting in not facilitating data security.

SUMMARY

Embodiments of the present application provide a data processing method and apparatus managing mobile application entrances, so as to perform uniform management on internal data at a mobile application entrance (for example, an enterprise number), thereby avoiding internal data corruption, and strengthening data security.

An embodiment of the present application provides a data processing method performed at a computer system managing application programming interfaces and mobile application entrances, including:

receiving an API invocation request initiated by an application system, the API invocation request carrying an identifier of a mobile application entrance to which the application system belongs, an application system identifier, and first authentication information;

obtaining permission information corresponding to the application system according to the identifier of the mobile application entrance and the application system identifier;

performing authentication on the API invocation request according to the permission information and the first authentication information;

sending an authentication succeeded result to the application system in accordance with a determination that the authentication succeeds, so that the application system invokes an API for data processing; and sending an authentication failed result to the application system in accordance with a determination that the authentication fails.

Correspondingly, an embodiment of the present application provides a data processing apparatus, including a receiving unit, an obtaining unit, and a sending unit, where the receiving unit is configured to receive an API invocation request initiated by an application system, the API invocation request carrying an identifier of a mobile application entrance to which the application system belongs, an application system identifier, and first authentication information;

the obtaining unit is configured to obtain permission information corresponding to the application system according to the identifier of the mobile application entrance and the application system identifier;

the authentication unit is configured to perform authentication on the API invocation request according to the permission information and the first authentication information; and the sending unit is configured to: send an authentication succeeded result to the application system when the authentication succeeds, so that the application system invokes an API for data processing; and send an authentication failed result to the application system when the authentication fails.

Correspondingly, an embodiment of the present application further provides a communications system, including any data processing apparatus provided in the embodiments of the present application.

According to the embodiments of the present application, an API invocation request initiated by an application system is received, the API invocation request carrying an identifier of a mobile application entrance to which the application system belongs, an application system identifier, and first authentication information; permission information corresponding to the application system is obtained according to the identifier of the mobile application entrance and the application system identifier; then authentication is performed on the API invocation request according to the permission information and the first authentication information; and the application system is allowed to invoke an API for data processing when the authentication succeeds, so that internal data corruption caused due to that each application system at the mobile application entrance (for example, an enterprise number) randomly invokes the API is avoided, thereby implementing uniform management on the internal data, greatly strengthening data security, and facilitating API interface expansion.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person skilled in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are some but not all of the embodiments of the present application. All other embodiments obtained by a person skilled in the art based on the embodiments of the present application without creative efforts shall fall within the protection scope of the present disclosure.

In the specification, claims, and accompanying drawings of the present application, the terms "first", "second", and so on are intended to distinguish between similar objects but do not necessarily indicate a specific order or sequence. It should be understood that the data termed in such a way are interchangeable in proper circumstances so that the embodiments of the present application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

An embodiment of the present application provides a data processing method and apparatus managing mobile application entrances.

Figure 1A:
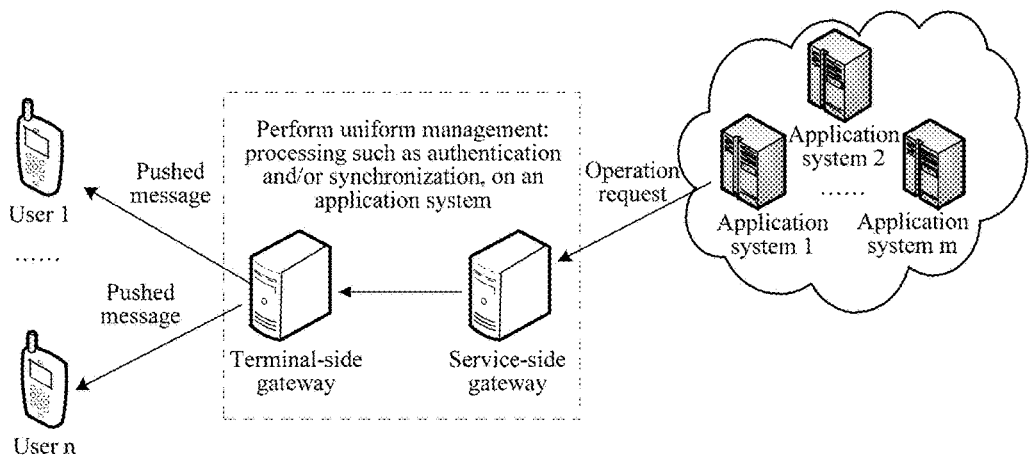
FIG. 1a is a schematic diagram of a scenario of a communications system according to an embodiment of the present application.

Referring to FIG. 1a, a communications system may include a data processing apparatus and multiple application systems such as an application system 1, an application system 2, and an application system m. The data processing apparatus may be integrated into a gateway, and the application systems respectively correspond to applications at a mobile application entrance. For example, using the mobile application entrance specifically being an enterprise number A as an example, the application systems respectively correspond to applications within the enterprise A. Each application system has corresponding application system identifier such as a service number. In a specific implementation, a corresponding permission, for example, a permission to invoke an API and/or a permission to perform an operation (such as synchronization) on an address book, may be preset for each application system. The gateway performs authentication on an operation request, such as an API invocation request, initiated by the application system according to the permission, and when the authentication succeeds, allows the application system to perform a corresponding operation such as invoking an API and pushing a message to a user by using the gateway, so as to implement uniform management on each application.

In a specific implementation, the gateway may be implemented as an independent entity, or may be divided into multiple entities. For example, as shown in FIG. 1a, the gateway may include a terminal-side gateway, a server-side gateway, and the like.

The following respectively performs detailed descriptions.

Embodiment 1

An embodiment of the present application is described from a perspective of a data processing apparatus. The data processing apparatus may specifically be integrated into a device such as a gateway, and the gateway may be implemented by an entity, or may be implemented by several entities. This is not described herein.

A data processing method is performed at a computer system having one or more processors and memory for storing a plurality of programs managing application programming interfaces and mobile application entrances, including: receiving an API invocation request initiated by an application system, the API invocation request carrying an identifier of a mobile application entrance to which the application system belongs, an application system identifier, and first authentication information; obtaining permission information corresponding to the application system according to the identifier of the mobile application entrance and the application system identifier; performing authentication on the API invocation request according to the permission information and the first authentication information; sending an authentication succeeded result to the application system in accordance with a determination that the authentication succeeds, so that the application system invokes an API for data processing; and sending an authentication failed result to the application system in accordance with a determination that the authentication fails.

Figure 1B:
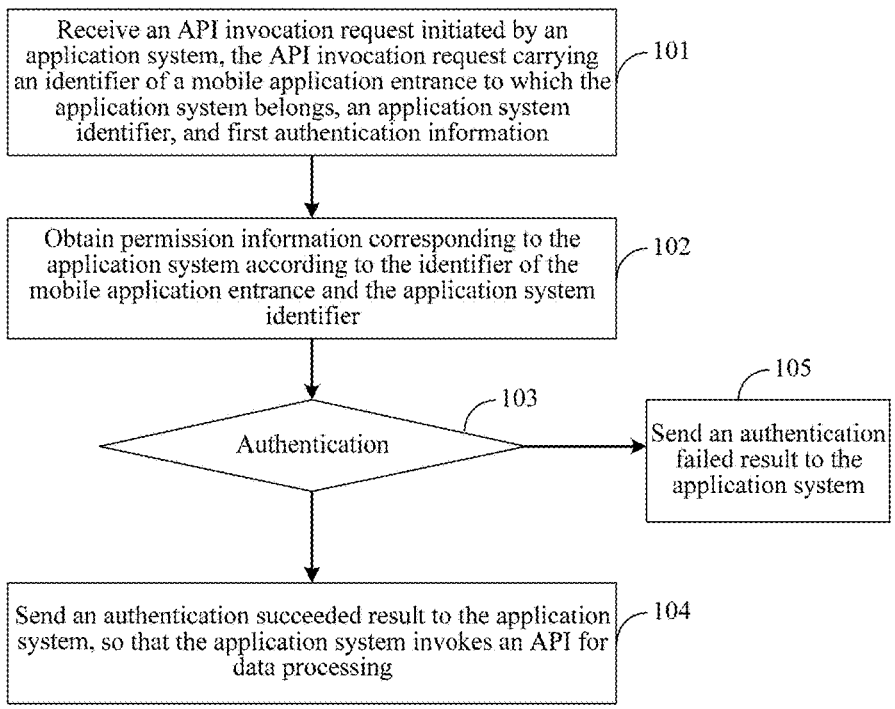
FIG. 1b is a flowchart of a data processing method according to an embodiment of the present application.

As shown in FIG. 1b, a specific process of the data processing method performed at a computer system having one or more processors and memory for storing a plurality of programs managing application programming interfaces and mobile application entrances may include the following operations:

101: Receive an API invocation request initiated by an application system, the API invocation request carrying an identifier of a mobile application entrance to which the application system belongs, an application system identifier, and first authentication information.

The identifier of the mobile application entrance is used for distinguishing different mobile application entrances, for example, the identifier of the mobile application entrance may be an enterprise number. The application system identifier is used for distinguishing different applications at the mobile application entrance, for example, the application system identifier is a service number at the enterprise number. The first authentication information is used for verifying whether the application system has a permission to invoke a corresponding API, and the first authentication information may include identity authentication information such as an account and a password.

102: Obtain permission information corresponding to the application system according to the identifier of the mobile application entrance and the application system identifier. For example, details may specifically be as follows:

obtaining a corresponding permission information set from a preset database according to the identifier of the mobile application entrance, and obtaining permission information corresponding to the application system from the permission information set according to the application system identifier.

For example, using a service number A1 at an enterprise number A as an example, specifically, a permission information set corresponding to the enterprise number A may be obtained from the preset database, permission information corresponding to the service A1 is obtained from the permission information set according to the application system identifier, and so on.

The database may include information such as the identifier of the mobile application entrance, a mapping between the application system identifier and the permission information, and user information. The database may be stored in the data processing apparatus such as a gateway, or may be stored in another storage device. This is not described herein.

103: Perform authentication on the API invocation request according to the permission information and the first authentication information, execute step 104 in accordance with a determination that the authentication succeeds, and execute step 105 in accordance with a determination that the authentication fails.

104: Send an authentication succeeded result to the application system when the authentication succeeds, so that the application system invokes an API for data processing.

For example, after receiving the authentication succeeded result, the application system may invoke the API to send a message to a user. For example, specifically, the application system may send the message that needs to be sent to the user to a gateway, and the gateway forwards the message to the user. Optionally, to improve information security, the gateway may encrypt the message, then send the message to the user, and the like.

105: Send an authentication failed result to the application system when the authentication fails, that is, not allow the application system to invoke the API interface, so as to prevent abuse of an API interface invocation function.

Similarly, a message sent by a user also needs to pass through the data processing apparatus such as a gateway, and the gateway processes the message and sends the message to a corresponding application system, that is, the data processing method performed at a computer system having one or more processors and memory for storing a plurality of programs managing application programming interfaces and mobile application entrances may further include:

receiving an operation message, sent by a user, carrying a user identifier and an operation instruction, determining a corresponding application system by searching a preset address book according to the user identifier, and forwarding the operation message to the application system, so that the application system performs data processing according to the operation instruction.

Later, the application system may further return a corresponding operation response to the user, that is, after the step of forwarding the operation message to the application system, the data processing method may further include:

receiving an operation response returned by the application system, and sending the operation response to the user.

When returning the operation response, the application system does not need to invoke the API interface. A message format and content of the operation response may be set according to a requirement of an actual application system, and may include one or more types of information such as a text, audio, a picture, a video, a webpage, and a file. This is not described herein.

It should be noted that if the operation message is encrypted, when receiving the operation message, the data processing apparatus further needs to decrypt the operation message, to extract the user identifier and the operation instruction.

In some implementations, the application system described in the present application is associated with and managed by an organization (e.g., a company) and the organization uses the protocol described in the present application to manage an address book of employees working at the organization, including distributing the address book to mobile terminals (e.g., smartphones) used by its employees via a mobile network. The address book may be set according to a requirement of an actual application system. The address book may be stored in a database, or independent of the database, and may be stored in the data processing apparatus such as a gateway, or stored in another device. The address book may be maintained by a maintainer by using the gateway, that is, the method may further include:

(1) Obtain an address book synchronization message from the application system, the address book synchronization message carrying second authentication information.

(2) Synchronize the address book according to the address book synchronization message when it is determined that the authentication succeeds according to the second authentication information. For example, details may specifically be as follows:

A: Obtain latest organization information according to the synchronization message, where the organization information may include organization structure information, user information under an organization structure, and the like.

The organization structure information may include information such as a department name, a department identifier, and a department mobile service identifier. The user information may include a user name, a user contact method, a name of a department to which a user belongs, an identifier of the department to which the user belongs, a mobile service identifier of the department to which the user belongs, a user mobile service identifier, and the like. The mobile service identifier may be an instant messaging account such as a WeChat number or a QQ number.

Using an enterprise number as an example, the user generally refers to an employee in the enterprise or another person related to the enterprise.

B: Synchronize organization structure information in the address book on the basis of the organization structure information in the organization information. For example, details may be as follows:

obtaining a mapping between a department identifier of each department under the organization structure and a department mobile service identifier; and performing an operation such as updating, insertion, and/or deletion on the organization structure information in the address book on the basis of the organization structure information in the organization information and the mapping.

C: Synchronize user information in the address book on the basis of the user information in the organization information. For example, details may be as follows:

determining a to-be-processed user queue according to the user information in the organization information and user information in the address book; and performing an operation such as updating, insertion, and/or deletion on the user information in the address book according to the to-be-processed user queue.

It can be known from the foregoing that according to this embodiment of the present application, an API invocation request initiated by an application system is received, the API invocation request carrying an identifier of a mobile application entrance to which the application system belongs, an application system identifier, and first authentication information; permission information corresponding to the application system is obtained according to the identifier of the mobile application entrance and the application system identifier; then authentication is performed on the API invocation request according to the permission information and the first authentication information; and the application system is allowed to invoke an API for data processing when the authentication succeeds, so that internal data corruption caused due to that each application system at the mobile application entrance (for example, an enterprise number) randomly invokes the API is avoided, thereby implementing uniform management on the internal data, greatly strengthening data security, and facilitating API interface expansion.

Embodiment 2

According to the method described in Embodiment 1, the following further performs detailed description by using an example.

In this embodiment, an example in which the data processing apparatus is specifically integrated into a gateway is used for description.

Figure 2A:
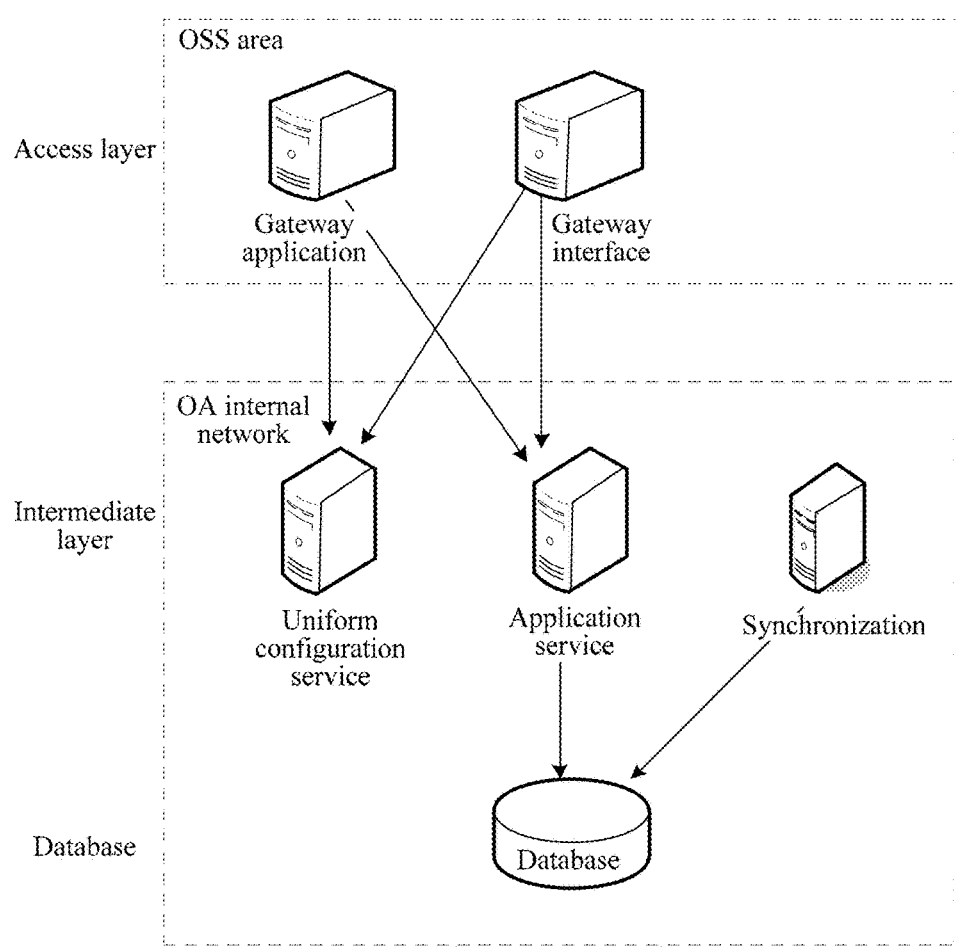
FIG. 2a is a structural diagram of a system in a data processing method according to an embodiment of the present application.

Referring to FIG. 2a, a system structure may include an access layer, an intermediate layer, and a database. The access layer is located in an operations support system (operations support system, OSS for short) area, and the intermediate layer and the database are located in an office automation (Office Automation, OA for short) internal network. Functions of each part may be as follows:

(1) The Access Layer:

The access layer may include a device such as a gateway. The gateway may include a terminal-side gateway and a server-side gateway, mainly provide an interface (that is, a gateway interface in FIG. 2a) based on a hypertext transfer protocol (HyperText Transfer Protocol, HTTP for short), take charge of communication between an instant communication platform and an application system (that is, a gateway application in FIG. 2a), and process as a proxy for an uplink-downlink message of each application system, for example, providing the uplink-downlink message to the application system or a user after performing processing such as sending, receiving, uniformly decrypting, and uniformly encrypting.

(2) The Intermediate Layer:

The intermediate layer is mainly configured to perform uniform configuration on the system structure, to implement cluster management on services. The intermediate layer may implement specific logic of interaction between each application service and the database, and set cache for common data, to improve request efficiency. Besides, the intermediate layer may deploy the OA internal network, to prevent a server exposed in an external network from being attacked, and the like. In addition, the intermediate layer may implement synchronization of data such as an address book in the database.

(3) The Database:

The database is mainly configured to store information such as an identifier of a mobile application entrance, a mapping between an application system identifier and permission information, and user information (such as the address book).

On the basis of the system structure, the following performs detailed description on an execution method of the system by using an enterprises number as an example.

Figure 2B:
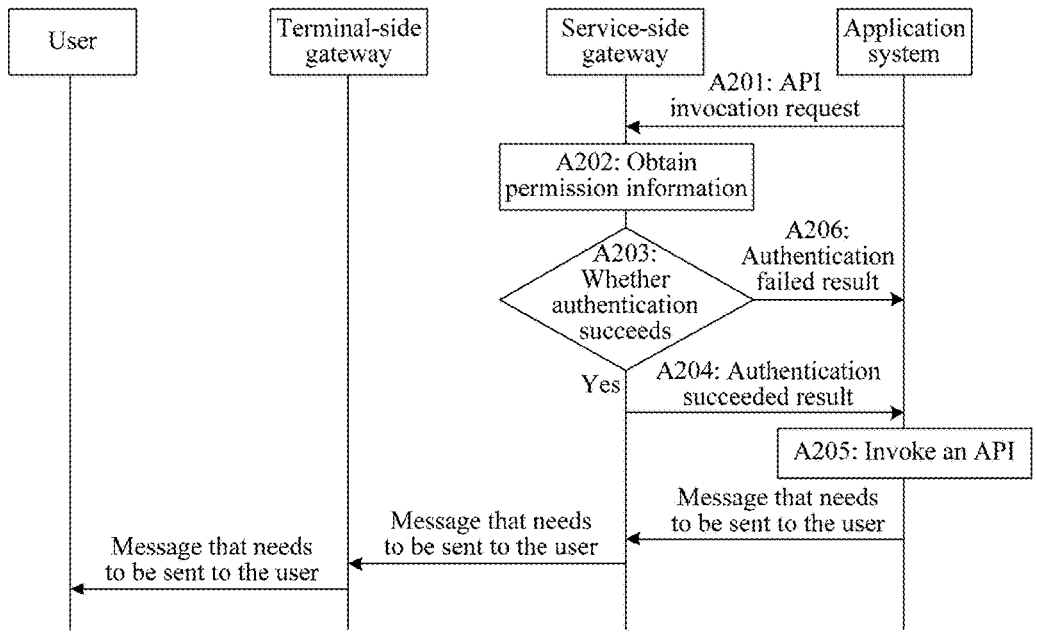
FIG. 2b is a flowchart of a data processing method according to the embodiment of the present application.

As shown in FIG. 2b, a specific process of a data processing method performed at a computer system (e.g., a server-side gateway) having one or more processors and memory for storing a plurality of programs managing application programming interfaces and mobile application entrances may be as follows:

A201: An application system sends an API invocation request to a server-side gateway, the API invocation request carrying an enterprise number identifier, an application system identifier, and first authentication information.

The first authentication information may include identity authentication information such as an account and a password.

A202: After receiving the API invocation request, the server-side gateway obtains a corresponding permission information set from a preset database according to the enterprise number identifier, and obtains permission information corresponding to the application system from the permission information set according to the application system identifier.

A203: The server-side gateway performs authentication on the API invocation request according to the permission information and the first authentication information, execute step 204 in accordance with a determination that the authentication succeeds, and execute step 206 in accordance with a determination that the authentication fails.

S204: The server-side gateway sends an authentication succeeded result to the application system when the authentication succeeds, and then execute step A205.

A205: The application system invokes an API after receiving the authentication succeeded result, and sends a message that needs to be sent to a user, to a terminal-side gateway, and the terminal-side gateway forwards the message to the user.

Optionally, to improve information security, the terminal-side gateway may encrypt the message, then send the message to the user, and the like.

A206: The server-side gateway sends an authentication failed result to the application system when the authentication fails, that is, does not allow the application system to invoke the API interface, so as to prevent abuse of an API interface invocation function.

Figure 2C:
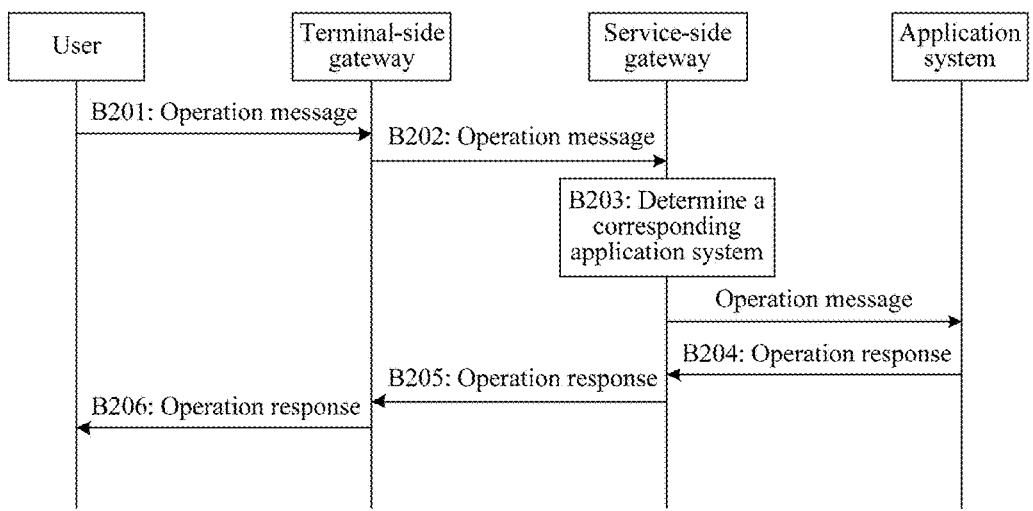
FIG. 2c is another flowchart of a data processing method according to the embodiment of the present application.

Similarly, a message sent by a user also needs to pass through the gateway, and the gateway processes the message and sends the message to a corresponding application system, that is, as shown in FIG. 2c, the data processing method may further include:

B201: The terminal-side gateway receives an operation message sent by a user, the operation message carrying information such as a user identifier and an operation instruction.

The operation message may be a message replied by the user or an event triggered by the user by clicking a menu on a client.

B202: The terminal-side gateway sends the operation message to the server-side gateway.

B203: The server-side gateway determines, after receiving the operation message, a corresponding application system by searching a preset address book according to the user identifier, and forwards the operation message to the application system.

It should be noted that if the operation message is encrypted, when receiving the operation message, the server-side gateway further needs to decrypt the operation message, to extract the user identifier and the operation instruction.

The address book may be set according to a requirement of an actual application system. The address book may be stored in the database, or may be independent of the database. For ease of description, in this embodiment, an example in which the address book is stored in the database is used for description. To improve efficiency of the address book, synchronization updating needs to be periodically performed on the address book according to change of an organization structure and/or change of user information. A synchronization method may specifically be as follows:

(1) Obtain an address book synchronization message from the application system, the address book synchronization message carrying second authentication information.

(2) Synchronize the address book according to the address book synchronization message when it is determined that the authentication succeeds according to the second authentication information. For example, details may specifically be as follows:

A: Obtain latest organization information according to the synchronization message, where the organization information may include organization structure information, user information under an organization structure, and the like.

The organization structure information may include information such as a department name, a department identifier, and a department mobile service identifier. The user information may include a user name, a user contact method, a name of a department to which a user belongs, an identifier of the department to which the user belongs, a mobile service identifier of the department to which the user belongs, a user mobile service identifier, and the like. The mobile service identifier may be an instant messaging account such as a WeChat number or a QQ number. In addition, the user information may further include other information, such as an age, a working age, an e-mail account, and/or a phone number, of the user.

It should be noted that to improve information security, exposure of the user information may be reduced as far as possible. For some of the user information, an identifier may be generated by using a confusion algorithm to replace the user information. This is not described herein.

Using an enterprise number as an example, the user generally refers to an employee in the enterprise or another person related to the enterprise.

B: Synchronize organization structure information in the address book on the basis of the organization structure information in the organization information. For example, details may be as follows:

obtaining a mapping between a department identifier of each department under the organization structure and a department mobile service identifier; and performing an operation such as updating, insertion, and/or deletion on the organization structure information in the address book on the basis of the organization structure information in the organization information and the mapping.

C: Synchronize user information in the address book on the basis of the user information in the organization information. For example, details may be as follows:

determining a to-be-processed user queue according to the user information in the organization information and user information in the address book; and performing an operation such as updating, insertion, and/or deletion, for example, deleting ex-employee information and adding a new employee, to ensure that users at the enterprise number are all employees, on the user information in the address book according to the to-be-processed user queue.

B204: The application system returns an operation response to the server-side gateway after receiving the operation message.

When returning the operation response, the application system does not need to invoke the API interface. A message format and content of the operation response may be set according to a requirement of an actual application system, and may include one or more types of information such as a text, audio, a picture, a video, a webpage, and a file. This is not described herein again.

B205: The server-side gateway sends the operation message to the terminal-side gateway.

B206: The terminal-side gateway sends the operation response to the user after receiving the operation response.

Optionally, before sending the operation response to the terminal-side gateway, to improve information security, the server-side gateway may further encrypt the operation response. This is not described herein again.

It can be known from the foregoing that in this embodiment, a gateway uniformly receives an API invocation request initiated by an application system, and performs, according to various information carried in the API invocation request, authentication on whether the application system has a permission to invoke an API interface, so that internal data corruption caused due to that each application system at an enterprise number randomly invoke the API is avoided. In addition, because the gateway may perform uniform management on invocation of the API interface, API interface expansion is facilitated, and more convenience is provided to an enterprise for developing a personalized API. Similarly, when receiving an operation message sent by a user, the gateway performs uniform management, including encrypting, decrypting, forwarding, and the like, so as to implement uniform management on internal data, thereby greatly strengthening data security. Further, when updating an address book, the gateway performs authentication and synchronization. Therefore, a case in the existing technology in which data error is caused due to that multiple parties arbitrarily operate the address book is avoided. In conclusion, by means of the solution, the uniform management on the internal data at the enterprise number may be implemented, thereby improving data accuracy and security. Besides, various API interface expansion is facilitated, thereby greatly improving user experience.

It should be noted that for each of the foregoing method embodiments, for ease of description, the method embodiment is described as a series of action combinations, but a person skilled in the art should learn that the present disclosure is not limited to a described action order because according to the present disclosure, some steps may use another order, or may be performed at the same time. Besides, the person skilled in the art should also learn that the embodiments described in this specification all belong to preferred embodiments, and related actions and modules are not necessary for the present disclosure.

By means of description of the foregoing implementation manners, the person skilled in the art may clearly learn that the method in the foregoing embodiment may be implemented by relying on software and a necessary commodity hardware platform, or by using hardware, but the former one is a preferred implementation manner in many cases. Based on the understanding, the technical solutions of the present disclosure, or parts contributing to the existing technology, may essentially be presented in a form of a software product. The computer software product is stored in a storage medium (such as a ROM/RAM, a magnetic disk, or an optical disc), and includes several instructions to enable a terminal device (which may be a cell phone, a computer, a server, a network device, or the like) to execute the method described in each embodiment of the present application.

Embodiment 3

Figure 3A:
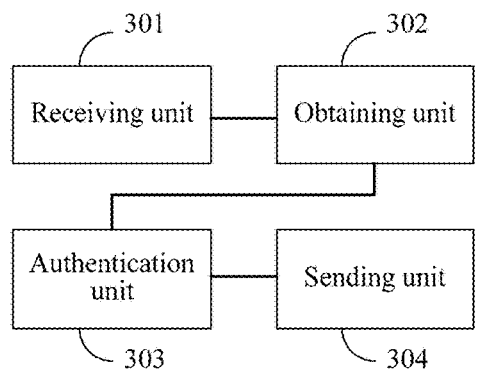
FIG. 3a is a schematic structural diagram of a data processing apparatus according to an embodiment of the present application.

To better implement the foregoing methods, an embodiment of the present application further provides a data processing apparatus. As shown in FIG. 3a, the data processing apparatus includes a receiving unit 301, an obtaining unit 302, an authentication unit 303, and a sending unit 304.

The receiving unit 301 is configured to receive an application programming interface (API) invocation request initiated by an application system, the API invocation request carrying an identifier of a mobile application entrance to which the application system belongs, an application system identifier, and first authentication information.

The identifier of the mobile application entrance is used for distinguishing different mobile application entrances, for example, the identifier of the mobile application entrance may be an enterprise number. The application system identifier is used for distinguishing different applications at the mobile application entrance, for example, the application system identifier is a service number at the enterprise number. The first authentication information is used for verifying whether the application system has a permission to invoke a corresponding API, and the first authentication information may include identity authentication information such as an account and a password.

The obtaining unit 302 is configured to obtain permission information corresponding to the application system according to the identifier of the mobile application entrance and the application system identifier. For example, details may be as follows:

The obtaining unit 302 may specifically be configured to: obtain a corresponding permission information set from a preset database according to the identifier of the mobile application entrance, and obtain permission information corresponding to the application system from the permission information set according to the application system identifier.

For example, using a service number A1 at an enterprise number A as an example, specifically, a permission information set corresponding to the enterprise number A may be obtained from the preset database, permission information corresponding to the service A1 is obtained from the permission information set according to the application system identifier, and so on.

The database may include information such as the identifier of the mobile application entrance, a mapping between the application system identifier and the permission information, and user information. The database may be stored in the data processing apparatus such as a gateway, or may be stored in another storage device. This is not described herein again.

The authentication unit 303 is configured to perform authentication on the API invocation request according to the permission information and the first authentication information.

The sending unit 304 is configured to: send an authentication succeeded result to the application system when the authentication succeeds, so that the application system invokes an API for data processing; and send an authentication failed result to the application system when the authentication fails.

For example, after receiving the authentication succeeded result, the application system may invoke the API to send a message to a user. For example, specifically, the application system may send the message that needs to be sent to the user to the sending unit 304, and the sending unit 304 forwards the message to the user. Optionally, to improve information security, the sending unit 304 may further encrypt the message, then send the message to the user, and the like.

Figure 3B:
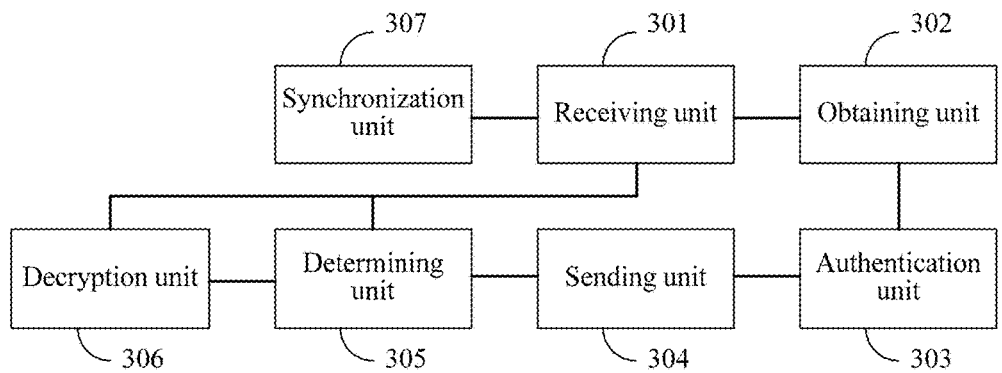
FIG. 3b is another schematic structural diagram of a data processing apparatus according to the embodiment of the present application.

Similarly, a message sent by a user also needs to pass through the data processing apparatus, and the data processing apparatus processes the message and sends the message to a corresponding application system, that is, as shown in FIG. 3b, the data processing apparatus may further include a determining unit 305, and details may be as follows:

The receiving unit 301 may further be configured to receive an operation message sent by a user, the operation message carrying information such as a user identifier and an operation instruction.

The determining unit 305 may be configured to determine a corresponding application system by searching a preset address book according to the user identifier.

The sending unit 304 may further be configured to forward the operation message to the application system, so that the application system performs data processing according to the operation instruction.

Later, the application system may further return a corresponding operation response to the user, that is:

The receiving unit 301 may further be configured to receive an operation response returned by the application system.

In this case, the sending unit 304 may further be configured to send the operation response to the user.

When returning the operation response, the application system does not need to invoke the API interface. A message format and content of the operation response may be set according to a requirement of an actual application system, and may include one or more types of information such as a text, audio, a picture, a video, a webpage, and a file. This is not described herein again.

It should be noted that if the operation message is encrypted, when receiving the operation message, the data processing apparatus further needs to decrypt the operation message, to extract the user identifier and the operation instruction. That is, as shown in FIG. 3b, the data processing apparatus may further include a decryption unit 306, and details may be as follows:

The decryption unit 306 may be configured to decrypt the operation message, to extract the user identifier and the operation instruction.

The address book may be set according to a requirement of an actual application system. The address book may be stored in a database, or independent of the database, and may be stored in the data processing apparatus such as a gateway, or stored in another device. The address book may be maintained by a maintainer by using the gateway, that is, as shown in FIG. 3b, the data processing apparatus may further include a synchronization unit 307, and details may be as follows:

The receiving unit 301 may be further configured to obtain an address book synchronization message, the address book synchronization message carrying second authentication information.

The synchronization unit 307 may be configured to synchronize the address book according to the address book synchronization message when it is determined that the authentication succeeds according to the second authentication information.

For example, the synchronization unit may include an information obtaining subunit, a first synchronization subunit, and a second synchronization subunit, and details are as follows:

The information obtaining subunit is configured to obtain latest organization information according to the synchronization message, the organization information including organization structure information and user information under an organization structure.

The organization structure information may include information such as a department name, a department identifier, and a department mobile service identifier. The user information may include a user name, a user contact method, a name of a department to which a user belongs, an identifier of the department to which the user belongs, a mobile service identifier of the department to which the user belongs, a user mobile service identifier, and the like. The mobile service identifier may be an instant messaging account such as a WeChat number or a QQ number. In addition, the user information may further include other information, such as an age, a working age, an e-mail account, and/or a phone number, of the user.

It should be noted that to improve information security, exposure of the user information may be reduced as far as possible. For some of the user information, an identifier may be generated by using a confusion algorithm to replace the user information. This is not described herein again.

Using an enterprise number as an example, the user generally refers to an employee in the enterprise or another person related to the enterprise.

The first synchronization subunit is configured to synchronize organization structure information in the address book on the basis of the organization structure information in the organization information. For example, details may be as follows:

The first synchronization subunit is specifically configured to: obtain a mapping between a department identifier of each department under the organization structure and a department mobile service identifier; and perform an operation such as updating, insertion, and/or deletion on the organization structure information in the address book on the basis of the organization structure information in the organization information and the mapping.

The second synchronization subunit is configured to synchronize user information in the address book on the basis of the user information in the organization information. For example, details may be as follows:

The second synchronization subunit is specifically configured to: determine a to-be-processed user queue according to the user information in the organization information and user information in the address book; and perform an operation such as updating, insertion, and/or deletion, for example, deleting ex-employee information and adding a new employee, to ensure that users at the enterprise number are all employees, on the user information in the address book according to the to-be-processed user queue.

During a specific implementation, each of the foregoing units may be implemented as an independent entity, or may be implemented as one or several entities through any combination. For a specific implementation of each unit, refer to the method embodiments above. This is not described herein again.

The data processing apparatus may specifically be integrated into a device such as a gateway, and the gateway may be implemented by using an entity, or may be implemented by using several entities. This is not described herein again.

It can be known from the foregoing that according to this embodiment, the receiving unit 301 of the data processing apparatus receives an API invocation request initiated by an application system, the API invocation request carrying an identifier of a mobile application entrance to which the application system belongs, an application system identifier, and first authentication information; the obtaining unit 302 obtains permission information corresponding to the application system according to the identifier of the mobile application entrance and the application system identifier; then the authentication unit 303 perform authentication on the API invocation request according to the permission information and the first authentication information; and the application system is allowed to invoke an API for data processing when the authentication succeeds, so that internal data corruption caused due to that each application system at the mobile application entrance (for example, an enterprise number) randomly invokes the API is avoided, thereby implementing uniform management on the internal data, greatly strengthening data security, and facilitating API interface expansion.

Embodiment 4

In addition, an embodiment of the present application further provides a communications system which may include any data processing apparatus provided in the embodiments of the present application, and reference may specifically be made to Embodiment 3. The data processing apparatus may be integrated into a device such as a gateway, and details may be as follows:

The gateway is configured to: receive an API invocation request initiated by an application system, the API invocation request carrying an identifier of a mobile application entrance to which the application system belongs, an application system identifier, and first authentication information; obtain permission information corresponding to the application system according to the identifier of the mobile application entrance and the application system identifier; perform authentication on the API invocation request according to the permission information and the first authentication information; send an authentication succeeded result to the application system in accordance with a determination that the authentication succeeds, so that the application system invokes an API for data processing; and send an authentication failed result to the application system in accordance with a determination that the authentication fails.

The gateway may further be configured to: receive an operation message, sent by a user, carrying a user identifier and an operation instruction, determine a corresponding application system by searching a preset address book according to the user identifier, and forward the operation message to the application system, so that the application system performs data processing according to the operation instruction.

In addition, the gateway may further be configured to: synchronize the address book. For example, specifically, the gateway may: obtain an address book synchronization message, the address book synchronization message carrying information such as second authentication information, and synchronize the address book according to the address book synchronization message when it is determined that the authentication succeeds according to the second authentication information. Specifically, reference may be made to the foregoing embodiments.

In addition, the communications system may further include an application system, and details may be as follows:

The application system is configured to: initiate an application programming interface (API) invocation request to the data processing apparatus, receive an authentication result returned by the data processing apparatus; and invoke an API for data processing when the authentication result (that is, an authentication succeeded result) indicates that authentication succeeds.

The application system may further be configured to send a message to the data processing apparatus, so that the data processing apparatus sends the message to the user.

For a specific implementation of each of the foregoing operations, reference may be made to the foregoing embodiments. This is not described herein again.

The communications system may include any data processing apparatus provided in the embodiments of the present application. Therefore, the communications system may implement same beneficial effects of any data processing apparatus provided in the embodiments of the present application. For details, reference may be made to the foregoing embodiments, and this is not described herein again.

Embodiment 5

A person of ordinary skill in the art may understand that all or part of the steps in each method in the foregoing embodiments may be implemented by instructing related hardware by a program. The program may be stored in a non-transitory computer readable storage medium, and the storage medium may include: a read only memory (ROM, Read Only Memory), a random access memory (RAM, Random Access Memory), a magnetic disk, an optical disc, or the like.

Optionally, in this embodiment, the foregoing storage medium may be located in at least one of multiple network devices in a computer network.

Optionally, in this embodiment, the storage medium is set to store program code for executing the following steps:

receiving an application programming interface (API) invocation request initiated by an application system, the API invocation request carrying an identifier of a mobile application entrance to which the application system belongs, an application system identifier, and first authentication information;

obtaining permission information corresponding to the application system according to the identifier of the mobile application entrance and the application system identifier;

performing authentication on the API invocation request according to the permission information and the first authentication information;

sending an authentication succeeded result to the application system in accordance with a determination that the authentication succeeds, so that the application system invokes an API for data processing; and sending an authentication failed result to the application system in accordance with a determination that the authentication fails.

Optionally, the storage medium is further set to store program code for executing the following steps: obtaining a corresponding permission information set from a preset database according to the identifier of the mobile application entrance; and obtaining permission information corresponding to the application system from the permission information set according to the application system identifier.

Optionally, the storage medium is further set to store program code for executing the following steps: receiving an operation message sent by a user, the operation message carrying a user identifier and an operation instruction; determining a corresponding application system by searching a preset address book according to the user identifier; and forwarding the operation message to the application system, so that the application system performs data processing according to the operation instruction.

Optionally, the storage medium is further set to store program code for executing the following steps: if the operation message is encrypted, before the determining a corresponding application system by searching a preset address book according to the user identifier, decrypting the operation message, to extract the user identifier and the operation instruction.

Optionally, the storage medium is further set to store program code for executing the following steps: receiving an operation response returned by the application system after the operation message is forwarded to the application system; and sending the operation response to the user.

Optionally, the storage medium is further set to store program code for executing the following steps: obtaining an address book synchronization message from the application system, the address book synchronization message carrying second authentication information; and synchronizing the address book according to the address book synchronization message when it is determined that the authentication succeeds according to the second authentication information.

Optionally, the storage medium is further set to store program code for executing the following steps: synchronizing the address book according to the address book synchronization message, including: obtaining latest organization information from the application system according to the synchronization message, the organization information including organization structure information, user information under an organization structure; synchronizing organization structure information in the address book on the basis of the organization structure information in the organization information; and synchronizing user information in the address book on the basis of the user information in the organization information.

Optionally, the storage medium is further set to store program code for executing the following steps: synchronizing organization structure information in the address book on the basis of the organization structure information in the organization information, including: obtaining a mapping between a department identifier of each department under the organization structure and a department mobile service identifier; and performing updating, insertion, and/or deletion on the organization structure information in the address book on the basis of the organization structure information in the organization information and the mapping.

Optionally, the storage medium is further set to store program code for executing the following steps: synchronizing user information in the address book on the basis of the user information in the organization information, including: determining a to-be-processed user queue according to the user information in the organization information and user information in the address book; and performing updating, insertion, and/or deletion on the user information in the address book according to the to-be-processed user queue.

Optionally, in this embodiment, the storage medium may include but is not limited to a medium, such as a USB flash drive, a read-only memory (ROM, Read-Only Memory), a random access memory (RAM, Random Access Memory), a removable hard disk, a magnetic disk, or an optical disc, that may store program code.

Embodiment 6

An embodiment of the present application further provides a computer terminal. The computer terminal may be any computer terminal device in a computer terminal group. Optionally, in this embodiment, the computer terminal may be replaced with a terminal device such as a mobile terminal.

Optionally, in this embodiment, the foregoing computer terminal may be located in at least one of multiple network devices in a computer network.

Figure 4:
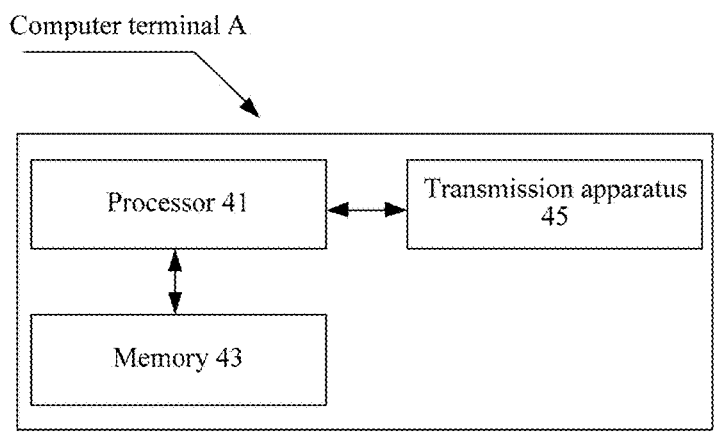
FIG. 4 is a structural block diagram of a computer terminal according to an embodiment of the present application.

Optionally, FIG. 4 is a structural block diagram of a computer terminal according to an embodiment of the present application. As shown in FIG. 4, the computer terminal A may include: one or more (only one is shown in the figure) processors 41, a memory 43, and a transmission apparatus 45.

The memory 43 may be configured to store software programs and modules, for example, program instructions/modules corresponding to the data processing method and apparatus managing APIs and mobile application entrances, and a system in the embodiments of the present application. The processor 41 executes various function applications and data processing, that is, implementing the data processing method, by running the software programs and modules that are stored in the memory 43. The memory 43 may include a high-speed random memory, and may further include a non-volatile memory such as one or more magnetic storage apparatuses, a flash, or another non-volatile solid-state memory. In some examples, the memory 43 may further include memories that are remotely set relative to the processor 41, and these remote memories may be connected to the computer terminal A by using a network. An example of the network includes but is not limited to the Internet, an enterprise internal network, a local area network, a mobile communications network, and a combination thereof.

The transmission apparatus 45 is configured to receive or send data by using one network. A specific example of the network may include a wired network or a wireless network. In an example, the transmission apparatus 45 includes a network adapter (e.g., Network Interface Controller, NIC). The network adapter may be connected to another network device and a router by using a network cable, to communicate with the Internet or a local area network. In an example, the transmission apparatus 45 is a radio frequency (Radio Frequency, RF) module, and is configured to communicate with the Internet in a wireless manner.

Specifically, the memory 43 is configured to store a preset action condition, information about a preset privileged user, and an application program.

The processor 41 may invoke, by using the transmission apparatus 45, the information and the application program that are stored in the memory 43, to execute the following steps:

receiving an application programming interface (API) invocation request initiated by an application system, the API invocation request carrying an identifier of a mobile application entrance to which the application system belongs, an application system identifier, and first authentication information;

obtaining permission information corresponding to the application system according to the identifier of the mobile application entrance and the application system identifier;

performing authentication on the API invocation request according to the permission information and the first authentication information;

sending an authentication succeeded result to the application system in accordance with a determination that the authentication succeeds, so that the application system invokes an API for data processing; and sending an authentication failed result to the application system in accordance with a determination that the authentication fails.

Optionally, for a specific example in this embodiment, reference may be made to the examples described in the foregoing embodiments. This is not described herein again.

The foregoing performs detailed description for the data processing method and apparatus performed at a computer system having one or more processors and memory for storing a plurality of programs managing application programming interfaces and mobile application entrances. In this specification, specific examples are used for explaining principles and implementation manners of the present disclosure, and description of the embodiments are merely used for helping to understand the method and a core idea thereof. In addition, for a person skilled in the art, according to the idea of the present disclosure, variations may be made on the specific implementation manners and the application scope. In conclusion, content of this specification should not be understood as a limitation to the present disclosure.

What is claimed is:

1. A data processing method performed at a computer system having one or more processors and memory for storing a plurality of programs managing application programming interfaces (APIs) of a social networking application and mobile application entrances, the method comprising:

receiving, at the social networking application, an application programming interface (API) invocation request initiated by an enterprise application system corresponding to an enterprise that includes a plurality of departments and a plurality of employees in the plurality of departments, the API invocation request carrying an identifier of a mobile application entrance to which the enterprise application system belongs, an application system identifier, and first authentication information, wherein each of the plurality of employees has a user account on the social networking application;

obtaining permission information corresponding to the enterprise application system according to the identifier of the mobile application entrance and the application system identifier;

performing authentication on the API invocation request according to the permission information and the first authentication information;

in accordance with a determination that the authentication on the API invocation request succeeds, sending an authentication succeeded result to the enterprise application system, wherein the enterprise application system invokes a first API of the APIs for data processing in accordance with the authentication succeeded result;

obtaining, from the enterprise application system, an address book synchronization message carrying second authentication information, distinct from the first authentication information;

performing authentication according to the second authentication information;

in accordance with a determination that the authentication according to the second authentication information succeeds, synchronizing a preset address book of the enterprise application system stored at the social networking application with organization structure information of the enterprise via the first API, the synchronizing the preset address book including:

for each department of the plurality of departments, obtaining a mapping between a department identifier corresponding to the department and a mobile service identifier corresponding to the department;

and updating the preset address book according to the organization structure information and the mapping, including adding to the preset address book a user identifier of a first new employee at the social networking application based on a corresponding update in the organization structure information;

after the synchronizing, receiving from the enterprise application system a first encrypted message to be sent to a client device associated with the first new employee of the enterprise having a first user account on the social networking application, wherein the first encrypted message carries the user identifier that identifies the first new employee at the social networking application and the client device is configured to decrypt the first message;

receiving an encrypted operation message sent by the first new employee via the social networking application in response to the first encrypted message, the operation message carrying the user identifier and an operation instruction;

decrypting the encrypted operation message to extract the user identifier and the operation instruction;

determining by searching the synchronized preset address book according to the user identifier that the operation message corresponds to a message for the enterprise application system;

forwarding the operation message to the enterprise application system, so that wherein the enterprise application system performs data processing according to the operation instruction;

after forwarding the operation message to the enterprise application system, receiving an operation response returned by the enterprise application system, wherein the enterprise application system generates the operation response based on the data processing of the operation instruction using a message format according to a predefined requirement by the enterprise application system; and sending the operation response to the first new employee, wherein the operation response is decrypted at the client device and rendered to the first new employee according to the message format.

2. The method according to claim 1, wherein the obtaining permission information corresponding to the enterprise application system according to the identifier of the mobile application entrance and the application system identifier comprises:

obtaining a corresponding permission information set from a preset database according to the identifier of the mobile application entrance; and obtaining the permission information corresponding to the enterprise application system from the permission information set according to the application system identifier.

3. The method according to claim 1, wherein the synchronizing the preset address book according to the address book synchronization message comprises:

obtaining latest organization information from the enterprise application system according to the address book synchronization message, the latest organization information including organization structure information and user information under an organization structure;

synchronizing the organization structure information in the preset address book on the basis of the organization structure information in the organization information; and synchronizing the user information in the preset address book on the basis of the user information in the organization information.

4. The method according to claim 3, wherein the synchronizing the user information in the preset address book on the basis of the user information in the organization information comprises:

determining a to-be-processed user queue according to the user information in the organization information and user information in the address book; and performing updating, insertion, and/or deletion on the user information in the address book according to the to-be-processed user queue.

5. The method according to claim 1, wherein the updating the preset address book according to the organization structure information includes performing, insertion and/or deletion on the organization structure information in the address book on the basis of the organization structure information in the organization information and the mapping.

6. A computer system, comprising:

one or more processors;

memory coupled to the one or more processors; and a plurality of programs stored in the memory and configured to manage application programming interfaces (APIs) of a social networking application and mobile application entrances, wherein the plurality of programs, when executed by the one or more processors, cause the computer system to perform operations comprising:

receiving, at the social networking application, an application programming interface (API) invocation request initiated by an enterprise application system corresponding to an enterprise that includes a plurality of departments and a plurality of employees in the plurality of departments, the API invocation request carrying an identifier of a mobile application entrance to which the enterprise application system belongs, an application system identifier, and first authentication information, wherein each of the plurality of employees has a user account on the social networking application;

obtaining permission information corresponding to the enterprise application system according to the identifier of the mobile application entrance and the application system identifier;

performing authentication on the API invocation request according to the permission information and the first authentication information;

in accordance with a determination that the authentication on the API invocation request succeeds, sending an authentication succeeded result to the enterprise application system, wherein the enterprise application system invokes a first API of the APIs for data processing in accordance with the authentication succeeded result;

obtaining, from the enterprise application system, an address book synchronization message carrying second authentication information, distinct from the first authentication information;

performing authentication according to the second authentication information;

in accordance with a determination that the authentication according to the second authentication information succeeds, synchronizing a preset address book of the enterprise application system stored at the social networking application with organization structure information of the enterprise via the first API, the synchronizing the preset address book including:

for each department of the plurality of departments, obtaining a mapping between a department identifier corresponding to the department and a mobile service identifier corresponding to the department; and updating the preset address book according to the organization structure information and the mapping, including adding to the preset address book a user identifier of a first new employee at the social networking application based on a corresponding update in the organization structure information;

after the synchronizing, receiving from the enterprise application system a first encrypted message to be sent to a client device associated with the first new employee of the enterprise having a first user account on the social networking application, wherein the first encrypted message carries the user identifier that identifies the first new employee at the social networking application and the client device is configured to decrypt the first message;

receiving an encrypted operation message sent by the first new employee via the social networking application in response to the first encrypted message, the operation message carrying the user identifier and an operation instruction;

decrypting the encrypted operation message to extract the user identifier and the operation instruction;

determining by searching the synchronized preset address book according to the user identifier that the operation message corresponds to a message for the enterprise application system;

forwarding the operation message to the application system, wherein the enterprise application system performs data processing according to the operation instruction;

after forwarding the operation message to the enterprise application system, receiving an operation response returned by the enterprise application system, wherein the enterprise application system generates the operation response based on the data processing of the operation instruction using a message format according to a predefined requirement by the enterprise application system; and sending the operation response to the first new employee, wherein the operation response is decrypted at the client device and rendered to the first new employee according to the message format.

7. The computer system according to claim 6, wherein the obtaining permission information corresponding to the enterprise application system according to the identifier of the mobile application entrance and the application system identifier comprises:

obtaining a corresponding permission information set from a preset database according to the identifier of the mobile application entrance; and obtaining the permission information corresponding to the enterprise application system from the permission information set according to the application system identifier.

8. The computer system according to claim 6, wherein the synchronizing the preset address book according to the address book synchronization message comprises:

obtaining latest organization information from the application system according to the address book synchronization message, the latest organization information including organization structure information and user information under an organization structure;

synchronizing the organization structure information in the preset address book on the basis of the organization structure information in the organization information; and synchronizing the user information in the preset address book on the basis of the user information in the organization information.

9. The computer system according to claim 8, wherein the synchronizing the user information in the preset address book on the basis of the user information in the organization information comprises:

determining a to-be-processed user queue according to the user information in the organization information and user information in the address book; and performing updating, insertion, and/or deletion on the user information in the address book according to the to-be-processed user queue.

10. The computer system according to claim 6, wherein the updating the preset address book according to the organization structure information includes performing insertion and/or deletion on the organization structure information in the address book on the basis of the organization structure information in the organization information and the mapping.

11. A non-transitory computer readable storage medium storing a plurality of programs managing application programming interfaces (APIs) of a social networking application and mobile application entrances, in conjunction with a computer system having one or more processors that execute the programs to perform operations including:

receiving, at the social networking application, an application programming interface (API) invocation request initiated by an enterprise application system corresponding to an enterprise that includes a plurality of departments and a plurality of employees in the plurality of departments, the API invocation request carrying an identifier of a mobile application entrance to which the enterprise application system belongs, an application system identifier, and first authentication information, wherein each of the plurality of employees has a user account on the social networking application;
obtaining permission information corresponding to the enterprise application system according to the identifier of the mobile application entrance and the application system identifier;
performing authentication on the API invocation request according to the permission information and the first authentication information;
in accordance with a determination that the authentication on the API invocation request succeeds, sending an authentication succeeded result to the enterprise application system, wherein the enterprise application system invokes a first API of the APIs for data processing in accordance with the authentication succeeded result;
obtaining, from the enterprise application system, an address book synchronization message carrying second authentication information, distinct from the first authentication information;
performing authentication according to the second authentication information;
in accordance with a determination that the authentication according to the second authentication information succeeds, synchronizing a preset address book of the enterprise application system stored at the social networking application with organization structure information of the enterprise via the first API, the synchronizing the preset address book including:
for each department of the plurality of departments, obtaining a mapping between a department identifier corresponding to the department and a mobile service identifier corresponding to the department; and
updating the preset address book according to the organization structure information and the mapping, including adding to the preset address book a user identifier of a first new employee at the social networking application based on a corresponding update in the organization structure information;
after the synchronizing, receiving from the enterprise application system a first encrypted message to be sent to a client device associated with the first new employee of the enterprise having a first user account on the social networking application, wherein the first encrypted message carries the user identifier that identifies the first new employee at the social networking application and the client device is configured to decrypt the first message;
receiving an encrypted operation message sent by the first new employee via the social networking application in response to the first encrypted message, the operation message carrying the user identifier and an operation instruction;
decrypting the encrypted operation message to extract the user identifier and the operation instruction;
determining by searching the synchronized preset address book according to the user identifier that the operation message corresponds to a message for the enterprise application system; and
forwarding the operation message to the application system, wherein the enterprise application system performs data processing according to the operation instruction;
after forwarding the operation message to the enterprise application system,
receiving an operation response returned by the enterprise application system, wherein the enterprise application system generates the operation response based on the data processing of the operation instruction using a message format according to a predefined requirement by the enterprise application system; and
sending the operation response to the first new employee, wherein the operation response is decrypted at the client device and rendered to the first new employee according to the message format.

* * * * *